US008621385B2

(12) United States Patent
Sauermann

(10) Patent No.: US 8,621,385 B2
(45) Date of Patent: Dec. 31, 2013

(54) SYSTEM AND METHOD FOR CONTROLLING A DISPLAY OF DATA

(75) Inventor: Volker Sauermann, Heidelberg (DE)

(73) Assignee: SAP AG, Walldorf (DE)

( * ) Notice: Subject to any disclaimer, the term of this patent is extended or adjusted under 35 U.S.C. 154(b) by 1953 days.

(21) Appl. No.: 10/850,663

(22) Filed: May 21, 2004

(65) Prior Publication Data

US 2005/0262450 A1 Nov. 24, 2005

(51) Int. Cl.
*G06F 3/048* (2013.01)
*G06F 17/00* (2006.01)
*G06F 17/30* (2006.01)

(52) U.S. Cl.
USPC ............................ 715/784; 715/786; 715/212

(58) Field of Classification Search
USPC ........... 715/509, 503, 784, 786, 212; 345/684
See application file for complete search history.

(56) References Cited

U.S. PATENT DOCUMENTS

| 5,339,391 | A | * | 8/1994 | Wroblewski et al. | 345/607 |
| 5,491,781 | A | * | 2/1996 | Gasperina | 715/786 |
| 5,655,094 | A | * | 8/1997 | Cline et al. | 715/786 |
| 5,712,995 | A | * | 1/1998 | Cohn | 715/792 |
| 5,721,847 | A | * | 2/1998 | Johnson | 715/786 |
| 5,874,961 | A | * | 2/1999 | Bates et al. | 715/786 |
| 5,903,267 | A | * | 5/1999 | Fisher | 715/786 |
| 5,973,663 | A | * | 10/1999 | Bates et al. | 715/786 |
| 6,380,947 | B1 | * | 4/2002 | Stead | 345/645 |
| 6,486,896 | B1 | * | 11/2002 | Ubillos | 715/784 |
| 6,690,401 | B1 | * | 2/2004 | Stead | 715/784 |
| 7,114,129 | B2 | * | 9/2006 | Awada et al. | 715/786 |
| 7,415,664 | B2 | * | 8/2008 | Aureglia et al. | 715/212 |
| 7,487,437 | B2 | * | 2/2009 | Aureglia et al. | 715/212 |
| 2002/0063737 | A1 | * | 5/2002 | Feig et al. | 345/786 |
| 2002/0145631 | A1 | * | 10/2002 | Arbab et al. | 345/786 |
| 2004/0119753 | A1 | * | 6/2004 | Zencke | 345/786 |

OTHER PUBLICATIONS

Stead, Larry, A Method and System for Displaying and Scrollinwg a Hirarchical Data Structure, Apr. 30, 2002, U.S. Appl. No. 60/145,015.*
Smith, Randall et al., "Generalized and Stationary Scrolling," Nov. 1999, ACM, All Pages.*

* cited by examiner

*Primary Examiner* — Jordany Nunez

(74) *Attorney, Agent, or Firm* — Kenyon & Kenyon LLP

(57) ABSTRACT

A system and method for displaying a scroll-bar or toggle-button-set to control a display of data of an individual column and/or row. A table of intersecting columns and rows is displayed, each intersection forming a cell, and a scroll-bar or toggle-button-set is displayed for an individual column and/or row if a cell of the column and/or row contains data, the display settings of the data requiring for a display of the data an area that is larger than an area allotted to the cell.

9 Claims, 6 Drawing Sheets

| Document ID | Time Stamp | Action | Docume | Return Code | Retries | Preprocess Retries | Transmit Retries | Synch Retries | Document Size(Bytes) |
|---|---|---|---|---|---|---|---|---|---|
| /DPA/Boulevard/Hollyw | Wed Mar 31 | 1index | Synchroniz | 0 | 1 | 1 | 1 | 1 | 4,478 |
| /DPA/Boulevard/Hollyw | Wed Mar 31 | 1index | Synchroniz | 0 | 1 | 1 | 1 | 1 | 3,737 |
| /DPA/Boulevard/Hollyw | Wed Mar 31 | 1index | Synchroniz | 0 | 1 | 1 | 1 | 1 | 4,378 |
| /DPA/Boulevard/Hollyw | Wed Mar 31 | 1index | Synchroniz | 0 | 1 | 1 | 1 | 1 | 387 |
| /DPA/Boulevard/Hollyw | Wed Mar 31 | 1index | Synchroniz | 0 | 1 | 1 | 1 | 1 | 3,747 |
| /DPA/Boulevard/Hollyw | Wed Mar 31 | 1index | Synchroniz | 0 | 1 | 1 | 1 | 1 | 3,939 |
| /DPA/Boulevard/Hollyw | Wed Mar 31 | 1index | Synchroniz | 0 | 1 | 1 | 1 | 1 | 3,754 |
| /DPA/Boulevard/Hollyw | Wed Mar 31 | 1index | Synchroniz | 0 | 1 | 1 | 1 | 1 | 3,705 |
| /DPA/Boulevard/Hollyw | Wed Mar 31 | 1index | Synchroniz | 0 | 1 | 1 | 1 | 1 | 3,890 |

Scroll Bar
1

FIG. 1a
(Prior Art)

SYSTEM AND METHOD FOR CONTROLLING A DISPLAY OF DATA

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND INFORMATION

Many electronic devices provide display areas, e.g., computer monitor screens, in which to display data. Often, because of the data's display properties, e.g., its font size, the data is too large to display all at once within the display area. For example, when the data represents a figure, the figure's vertical height or the figure's horizontal width may be, respectively, higher or wider than the vertical height or horizontal width of the display area; or when the data represents text, the number of lines of text may exceed a number of lines that fits within the vertical height of the display area, or the length of each text line may exceed a text length that fits within the horizontal width of the display area.

In these instances, to navigate throughout displayable data, an interface, e.g., a graphical user interface (GUI), often provides scroll-bars or toggle-buttons. Scroll-bars are each displayed as a single bar with a predefined length that can be shifted within a predefined space. Often, the predefined space spans across the area in which the data is to be displayed. They may be vertically displayed when the data's vertical height exceeds that of the display area's vertical height, and horizontally displayed when the data's horizontal width exceeds that of the display area's horizontal width. Toggle-buttons are each displayed as a set of two buttons, one placed at a first extremity and another placed at second extremity opposite the first extremity. A user may shift a scroll-bar or depress a toggle-button and thereby indicate a direction in which the data should scroll.

Data applications, especially business data applications, often arrange interrelated data in tables. A table is arranged according to, and illustrates, the structural interrelationship of its data. For example, a table may have columns and rows. Each column may, for example, represent a major category of data. Each row may, for example, represent a sub-category of the major categories. The rows and columns may intersect to form multiple cells. Display of data in a particular cell of the table may indicate that the data relates to the major category of the data's cell's column, and to the sub-category of the of the data's cell's row.

When the sum of all columns' widths exceeds the display area's width or when the sum of all the rows' heights exceeds the display area's height, the data applications provide, respectively, a horizontal scroll-bar or toggle-button to horizontally scroll and/or toggle between the first and last columns, and a vertical scroll-bar or toggle button to vertically scroll and/or toggle between the first and the last rows. For example, a scroll-bar 1 is provided in FIG. 1a. In response to a shift of scroll-bar 1, the entire table, i.e. all columns of the table collectively, may shift. For example, when scroll-bar 1 is shifted to the right, a previously non-displayed column to the right of the column labeled "Document Size" may be displayed; and the previously displayed column labeled "Document ID" may be removed from the display area.

Data, e.g., text, within a row of a particular column may be wider than the particular column, although not necessarily wider than the entire display area. In this instance, not all of the row's text can be viewed at once. For example, in FIG. 1a, the text within each of the cells of the column labeled "Time Stamp" is wider than the column, so that the year is only partially displayed. However, current data applications do not provide for scrolling and/or toggling data within a particular column and/or row, via control of a scroll-bar and/or toggle-buttons. For example, even when scroll-bar 1 is shifted to the right, the text within the "Time Stamp" column will not scroll in relation to the column to reveal the entire year of the cell. Currently, to view all of a cell's text, a user can widen the cell's column; select the text and have a portion of the text superimposed over adjacent columns; or select the text and use an arrow key on a keyboard to move a cursor through and thereby scroll through the data. The first alternative wastes much of the display area. When a column is widened, the column occupies more of the display area, thereby allowing a fewer number of columns to be concurrently displayed. Furthermore, a column may contain numerous rows with data that is not wider than the column's width. For these rows, widening the column width, and thereby using more of the display area is wasteful. The second alternative causes rows of adjacent column to overlap. Furthermore, the second and third alternatives are not as convenient and as easy as scrolling with a scroll-bar or toggle-button. These same alternatives apply when the height of data within the columns of a particular row exceeds the height of the data's particular row.

BRIEF DESCRIPTION OF THE DRAWINGS

FIG. 1a is an illustration of an example prior art scroll-bar for a table.

DETAILED DESCRIPTION

Figure 1B:
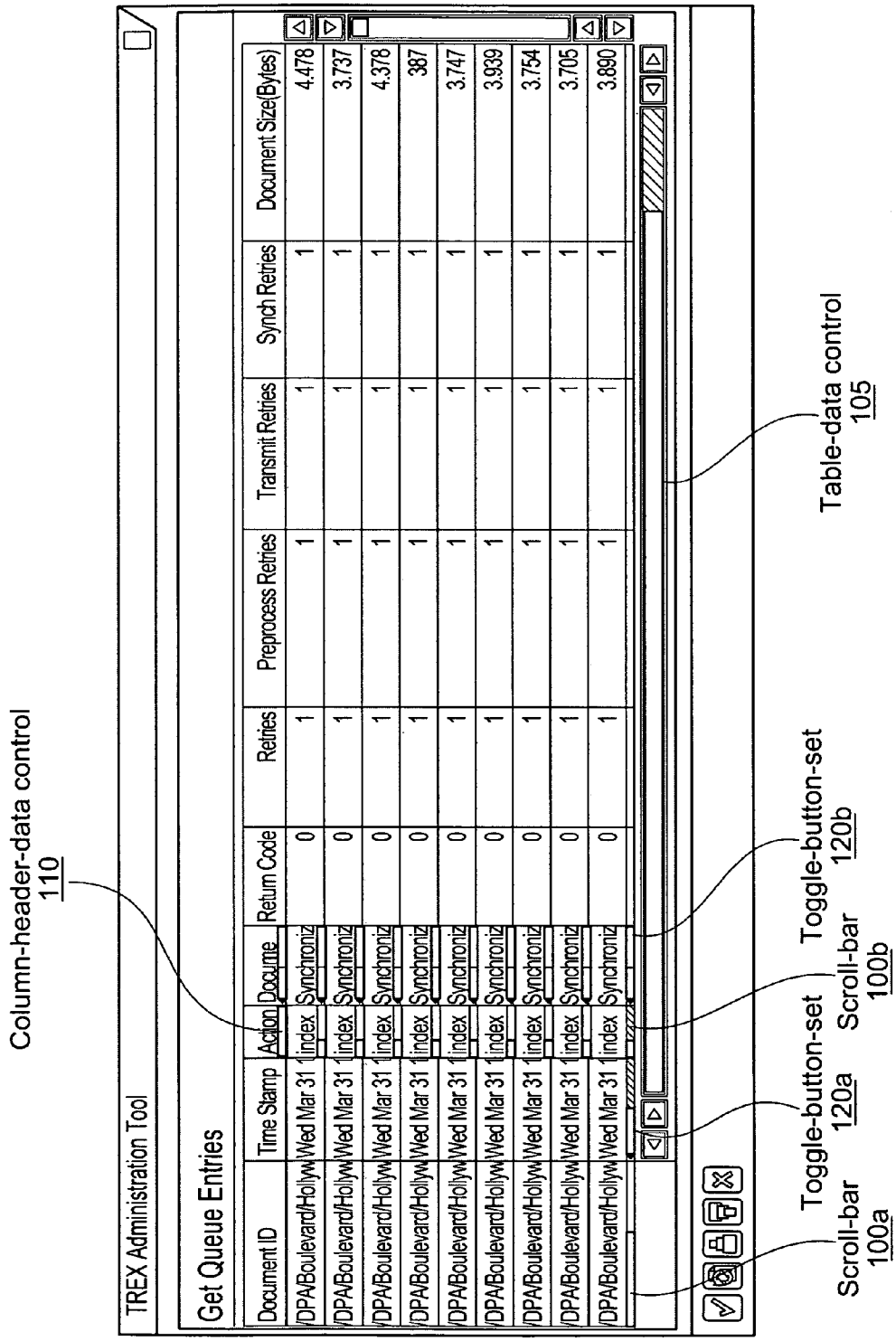
FIG. 1b is an illustration of example scroll-bars and toggle-button-sets associated with individual columns and/or cells, according to an example embodiment of the present invention.

Current data applications do not provide scroll-bars and/or toggle buttons that are associated with individual columns and/or rows of a table of interrelated data. Accordingly, there is a need in the art for scroll-bars, toggle-buttons, or a combination of the two, for individual columns and/or rows in a data application.

Embodiments of the present invention generally relate to scroll-bars and toggle-buttons. More particularly, embodiments relate to scroll-bars and toggle-buttons for individual columns and/or rows of a table in a data application environment.

According to an embodiment of the present invention, a display, e.g., a computer screen, may display data within a display area, e.g., a window, in a table-like form that has a number of columns and a number of rows. The columns and rows may intersect. Each row may span all of the columns. Each column may span all of the rows. Consequently, the rows and columns may form numerous intersections. Each intersection may represent a relationship of a particular column with a particular row. These intersections, or data cells, may contain data that pertains to the particular column/row intersection.

The first cell of each column (i.e., the intersection of the first row with each of the columns) may contain a header. The header may categorically describe the type of data contained within the cells of the described column. Each column's width may be automatically set to display the complete column header. Alternatively, users may choose any desired column width. Similarly, the first cell of each row (i.e., the intersection of the first column with each of the rows) may contain a header. The row height may be automatically set to display the complete row header. Alternatively, users may choose any desired row height.

Each cell's width may be set according to the width of its column and its height may be set according to the height of its row. One or many cells may contain an amount of data too large to display at once within the cell, thereby requiring a user to scroll through the cell's data (i.e., horizontally and/or vertically).

In an embodiment of the present invention, a column-data control is a control device which controls the horizontal scrolling and/or toggling of data within a particular column (or a particular cell of a column). A row-data control is a control which controls the vertical scrolling and/or toggling of data within a particular row (or a particular cell of a row). A horizontal table-data control may be a control which controls the horizontal scrolling and/or toggling of a table, e.g., of multiple columns within a table. A vertical table-data control may be a control which controls the vertical scrolling and/or toggling of a table, e.g., of multiple rows within a table.

In an embodiment of the present invention, the column-data control may be a horizontal scroll-bar. Alternatively, the column-data control may be a horizontal toggle-button-set. Alternatively, the column-data control may be a combination of a horizontal scroll-bar and toggle-button-set.

In an embodiment of the present invention, the row-data control may be a vertical scroll-bar. Alternatively, the row-data control may be a vertical toggle-button-set. Alternatively, the row-data control may be a combination of a vertical scroll-bar and toggle-button-set.

In an embodiment of the present invention, the horizontal table-data control may be a horizontal scroll-bar. Alternatively, the horizontal table-data control may be a horizontal toggle-button-set. Alternatively, the horizontal table-data control may be a combination of a horizontal scroll-bar and toggle-button-set.

In an embodiment of the present invention, the vertical table-data control may be a vertical scroll-bar. Alternatively, the vertical table-data control may be a vertical toggle-button-set. Alternatively, the vertical table-data control may be a combination of a vertical scroll-bar and toggle-button-set.

Although many of the embodiments discussed below are discussed with respect to horizontal scrolling and toggling of data, those skilled in the art can appreciate that the discussed embodiments equally pertain to vertical scrolling and toggling of data.

To horizontally scroll through a cell's data, embodiments of the present invention may provide for a scroll-bar assigned to an individual column. FIG. 1b illustrates an example display area that includes a table with multiple columns and rows that intersect to form a plurality of cells. Scroll-bar 100a may be assigned to an individual column. Scroll-bar 100a may be provided in addition to horizontal table-data control 105 used for scrolling between a first end and a last end of the table. For example, table-data control 105 may span across approximately the entire display area between the right-most and left-most columns, and scroll-bar 100a may span across the column to which scroll-bar 100a is assigned.

Users may shift scroll-bar 100a, e.g., between the column's right and left extremity. When scroll-bar 100a is moved in one direction, the data, e.g., text, in a cell of the column to which scroll-bar 100a is assigned may proportionately scroll in an opposite direction, thereby displaying text positioned in the direction in which scroll-bar 100a is shifted. For example, when scroll-bar 100a is shifted towards the left extremity, the text may stream to the right, thereby displaying text positioned towards the left of the cell.

In an embodiment of the present invention, each column may be assigned only one scroll-bar. According to this embodiment, in response to a horizontal shift of the assigned scroll-bar 100a, the data, e.g., text, contained within all cells of the column may simultaneously stream. In one embodiment, only data too wide to view all at once within its cell, may stream. In another embodiment only data within a cell that is selected may stream. In another embodiment, when no particular cell is selected, data too wide to view all at once, within all cells of the column may simultaneously stream; and when a particular cell is selected, data of only the selected cell may stream, e.g., if the data is too wide to view at once within the cell.

In an alternative embodiment of the present invention, each column may be assigned numerous scroll-bars 100b, so that each cell, e.g., that contains text that can not be viewed all at once, may be assigned its own scroll-bar. According to this embodiment, each scroll-bar may be displayed within the particular cell to which it is assigned.

In an alternative embodiment of the present invention, data of the column's header cell, may be controlled by a column-header-data control 110. (Similarly, data of a row's header cell may be controlled by a row-header-data control.) According to this embodiment, each column may be assigned two column-scroll-bars, one to control data of general cells, e.g., scroll-bar 100a, and another to control data of the header cell. According to this embodiment, when the former scroll-bar is shifted, one or more general cells' data may responsively scroll, without causing the header data to scroll; and when the latter scroll-bar is shifted, the header data may responsively scroll, without causing the general cells' data to scroll. The scroll-bar assigned to the header cell may be displayed within the header cell; and the scroll-bars assigned to the general cells may be displayed within the general cells or at the top or bottom of the column.

The length of the column's scroll-bar may be fixed, independent of the amount of data to be scrolled. Alternatively, since shortening the scroll-bar provides the scroll-bar with a larger area in which to be shifted, and since wider data requires more scrolling than narrower data, the scroll-bar length may automatically vary so that it is inversely proportionate to the width of the data that is to be scrolled. Thus, the wider the data to be scrolled, the shorter the scroll-bar.

According to the latter embodiment, when more than one cell of a column contains data that is wider than the cells' column, a number of possible lengths may be alternatively assigned to the scroll-bar. For example, one cell's data may be twice as wide as a second cell's data. A scroll-bar inversely proportionate to the shorter data would be twice as long as a scroll-bar inversely proportionate to the longer data.

The scroll-bar may be provided with a length inversely proportionate to the widest data within the column. Alternatively, when the height of the display area is insufficient to concurrently display all of the rows, the column's scroll-bar may be provided with a length inversely proportionate to the widest data of the portion of the cells that is displayed within the display area. According to the latter embodiment, as a user vertically scrolls between the first and last rows of the column, the length of the column's scroll-bar may change. According to either alternative, in an embodiment of the present invention, when a particular cell is selected, the scroll-bar may be provided with a length inversely proportionate to the selected cell's data. In an embodiment where a column's scroll-bar is assigned to each cell that contains too large an amount of data, each of the column's scroll-bars may be assigned a length inversely proportionate to its assigned cell's data.

According to an embodiment of the present invention, one or more cells of the column may contain data that is wider than the column. Other cells of the column may contain data that is not wider than the column. When the height of the display area is insufficient to concurrently display all of the rows of a column, a user may vertically scroll between the first and last rows of the column. In some views, the cells with the large data may be displayed within the display area. In other views, the cells with the large data may not be displayed.

When the cells containing the data that is wider than the column are displayed within the display area, the column-data control may be displayed. When the cells containing the data that is wider than the column are not displayed within the display area, the column-data control may not be displayed.

In an alternative embodiment of the present invention, even if none of the cells that have the data that is wider than the column are displayed within the display area, the column-data control may be displayed.

When data of multiple cells simultaneously scroll in response to a shift of a column's scroll-bar, e.g., when a single scroll-bar is assigned to a column that contains multiple cells with data that is too wide to view at once, the pace at which one cell's data scrolls may differ from that of another cell. For example, one cell's data may be twice as wide as a second cell's data. The pace at which the second cell's data scrolls may be twice as slow as that of the first cell's data.

To horizontally scroll through a cell's data, embodiments of the present invention may provide for a toggle-button-set, e.g., made up of two toggle-buttons, assigned to an individual column. Toggle-button-set 120a may be assigned to an individual column. Toggle-button-set 120a may be provided in addition to horizontal table-data control 105 used for scrolling between a first end and a last end of the table.

Toggle-button-set 100a may be horizontally displayed, one toggle-button on the right and one toggle-button on the left. When a toggle-button is depressed, the data, e.g., text, in a cell contained in a column to which toggle-button-set 100a is assigned may proportionately scroll in a direction opposite to the depressed toggle-button. For example, when the left toggle-button is depressed, the text may scroll to the right, thereby displaying text positioned towards the left of the cell. The text may scroll a predefined amount for each toggle-button depression. With multiple toggle-button depressions, a user may scroll to an end of the text within a cell. Alternatively, the text may scroll in proportion with the amount of time in which the toggle-button is depressed, the longer the toggle-button is depressed, the more the text scrolls.

In an alternative embodiment, the text may toggle, rather than scroll, between a left end of the text and a right end of the text depending on which toggle-button is depressed. According to this embodiment, there are only two possible views for each cell that contains an amount of data too large to view all at once. Either a right end or a left end of the text may be viewed.

In an embodiment of the present invention, each column may be assigned only one toggle-button-set. In response to a depression of a toggle-button, the text contained within all cells of the column may simultaneously scroll or toggle. In one embodiment, only text, the width of which is too large to view all at once within its cell, may scroll or toggle. In another embodiment only text within a cell that is selected may scroll or toggle. In another embodiment, when no particular cell is selected, text, too wide to view all at once, within all cells may simultaneously scroll or toggle; and when a particular cell is selected, text of only the selected cell may scroll or toggle.

When text of multiple cells in a column simultaneously scroll in response to a toggle-button depression, e.g., a depression of a toggle-button of toggle-button-set 100a, the pace at which one cell's data scrolls may differ from that of another cell. For example, one cell's data may be twice as wide as a second cell's data. The pace at which the second cell's data scrolls may be twice as slow as that of the first cell's data. Alternatively, the two cell's data may scroll at the same pace. When an end of the second cell's data is displayed, the second cell's data may cease scrolling, while the first cell's data may continue to scroll.

In an alternative embodiment of the present invention, each column may be assigned numerous toggle-button-sets 120b. According to this embodiment, each cell, e.g., that contains text that can not be viewed all at once, may be assigned its own toggle-button-set.

In an alternative embodiment of the present invention, each column may be assigned two toggle-button-sets, one to control data of general cells, e.g., toggle-button-set 120a, and another to control data within the header. According to this embodiment, when the former toggle-button-set is controlled, data of one or more general cells may responsively scroll or toggle, without causing the header data to scroll or toggle; and when the latter toggle-button-set is controlled, the header data may responsively scroll or toggle, without causing the data of the general data cells to scroll or toggle.

The toggle-button-set may be horizontally displayed as two toggle-buttons immediately adjacent to each other, e.g., like the toggle-buttons of toggle-button-set 120a. Alternatively, they may be displayed as two toggle-buttons at opposite ends with a space between them. When a toggle-button is depressed, it may be displayed differently than the non-depressed toggle-button. The different ways in which the toggle-buttons are displayed may indicate which toggle-button is depressed. For example, one toggle-button may be displayed with a concave appearance; and the other toggle-button may be displayed with a convex appearance. Alternatively, an arrow may be displayed within the depressed toggle-button; and no arrow may be displayed in the non-depressed toggle-button. For example, the display of an arrow at the left end of the left toggle-button of toggle-button-set 120a may indicate that the left toggle-button is depressed. The arrow may point in the direction of the toggle-button in which it is displayed. For example, if the arrow is displayed within the left toggle-button, then the arrow may point to the left. Alternatively, the depressed and non-depressed toggle-buttons may be displayed with varying colors. In a further alternative embodiment, a combination of any of the above may be used. Any way in which to vary the appearance between the selected and the non-selected toggle-button may be used.

In an embodiment of the present invention, when multiple columns each require a column-data control, they may each be assigned a scroll-bar, a toggle-button-set, or a combination of the two. The type of column-data control assigned to one column may differ from that assigned to a second column. For example, scroll-bar 100a may be provided for one column, and toggle-button-set 120a may be provided for a second column.

A column's scroll-bar and/or toggle-button-set may be displayed at the top or the bottom of the column, or both. When displayed within a particular cell, it may be displayed at the top or the bottom of the cell. When multiple columns are each provided a scroll-bar and/or toggle-button-set, the scroll-bars and toggle-button-sets may be displayed in one position for one column and in a second position for a second column.

According to the embodiment where the column-data control is displayed at the bottom of the column, if a horizontal table-data control is also displayed, the table-data control may be displayed at the lowest part or approximately the lowest part of the display area, and the column-data control may displayed immediately above a portion of the table-data control. Similarly, if displayed at the top of the column, the table-data control may be displayed at the top most part or approximately the top most part of the display area and the column-data control may be displayed immediately below the table-data control. In an alternative embodiment, the display-data control may be displayed at the bottom of the display area, and the column-data control may be displayed at the top of the display area, or vice versa.

According to the embodiment where the data toggles between a right and left end in response to the depression of the right and left toggle-buttons, respectively, when a cell's data is more than twice as wide as its column, not all of the text is viewable by toggling between the right and left ends of the text. Consequently, a toggle-button-set may be provided when a cell's text is not more than twice as wide as its column, and a scroll-bar may be provided when a cell's text is more than twice as wide as its column.

In an embodiment where a column-data control may be provided for each cell that contains data that is wider than the column, a scroll-bar may be provided for one cell that contains data that is more than double the width of the column; and a toggle-button-set may be provided for another cell that contains data that is not more than double the width of the column. In an embodiment where only one scroll-bar or toggle-button-set may be provided per column, if the text of a cell that contains the largest amount of text in its column is more than twice as wide as its column, a scroll-bar may be provided for the entire column; if the column contains no such cell, then a toggle-button-set may be provided for the entire column. Alternatively, when the height of the display area is insufficient to concurrently display all of the rows of the column, if data of a cell that appears within the display area is more than twice as wide as the column, then a scroll-bar may be provided for the column; otherwise a toggle-button-set may be provided for the column.

In an alternative embodiment, a user may choose whether to display a scroll-bar or a toggle-button-set. The user may choose to display a scroll-bar for one column and a toggle-button-set for a second column. The user may choose to display a scroll-bar or a toggle-button-set on a cell by cell basis.

Figure 2:
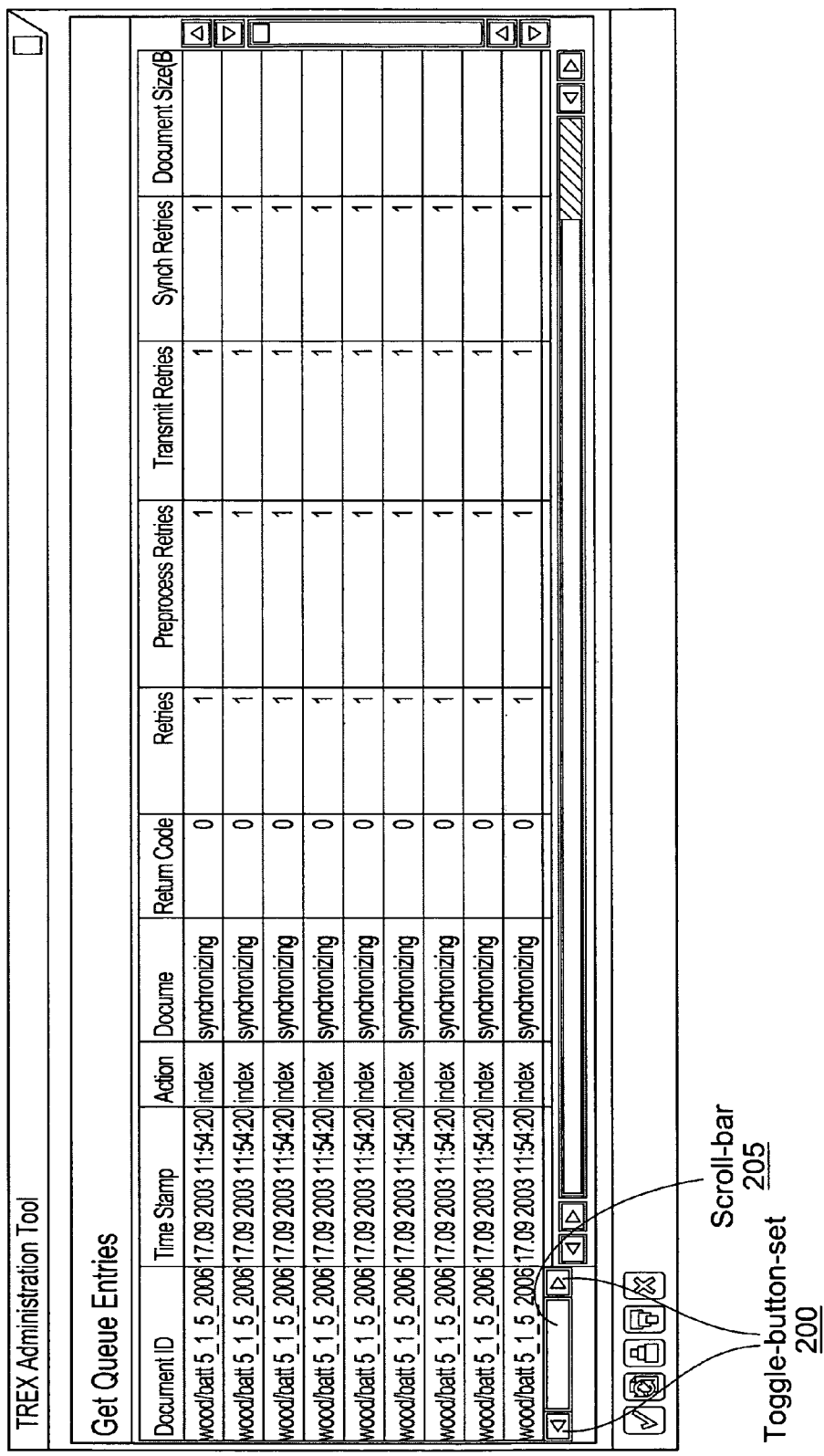
FIG. 2 is an illustration of an example combination of a scroll-bar and a toggle-button-set associated with an individual column, according to an example embodiment of the present invention.

In an embodiment of the present invention, a scroll-bar and toggle-button-set may be combined, e.g., by default and/or by user choice. For example, as illustrated in FIG. 2, toggle-button-set 200 may be displayed as two toggle-buttons at opposite ends of a column, with a space between the two toggle-buttons. Scroll-bar 205 may be provided between the two toggle-buttons. According to this embodiment, when either of the scroll-bar or the toggle-button-set is, respectively, shifted or depressed, the other correspondingly reacts. For example, if the left-toggle-button is depressed, scroll-bar 205 correspondingly shifts to the left; if scroll-bar 205 is shifted to the right, the right toggle-button may be displayed so as to indicate its depression.

In an embodiment of the present invention, all of a table's scroll-bars and toggle-button-sets, including each column-data control and any table-data control, may be concurrently displayed. Alternatively, when a particular column is selected, only the selected column's column-data control and any table-data control may be concurrently displayed. Alternatively, in an embodiment where each cell may be provided with its own scroll-bar or toggle-button-set, when a particular cell is selected, only the selected cell's scroll-bar or toggle-button-set and any table-data control may be concurrently displayed.

In an embodiment of the present invention, a particular column and/or cell may be selected via a click of a mouse when a cursor and/or a mouse pointer is moved to within a vicinity of the column and/or cell. Alternatively, the column and/or cell may be selected via the movement of a cursor and/or mouse pointer to within a vicinity of the column and/or cell, even without a mouse click.

According to an embodiment of the present invention, when a cell contains data that is wider than the cell's column and taller than the cell's row, a column-data control for the cell's column and a row-data control for the cell's row may be concurrently displayed. In accordance with the previously described embodiments, the column-data control and the row-data control may be each displayed within the cell. For example, the row-data control may be displayed to span from the top of the cell towards the bottom of the cell, at the right side of the cell. The column-data control may be displayed to span from the left side of the cell towards the right side of the cell, at the bottom of the cell. Alternatively, one or both of the row-data control and the column-data control may be displayed outside the cell, e.g., at the right side of the row and at the bottom of the column, respectively.

Figure 3:
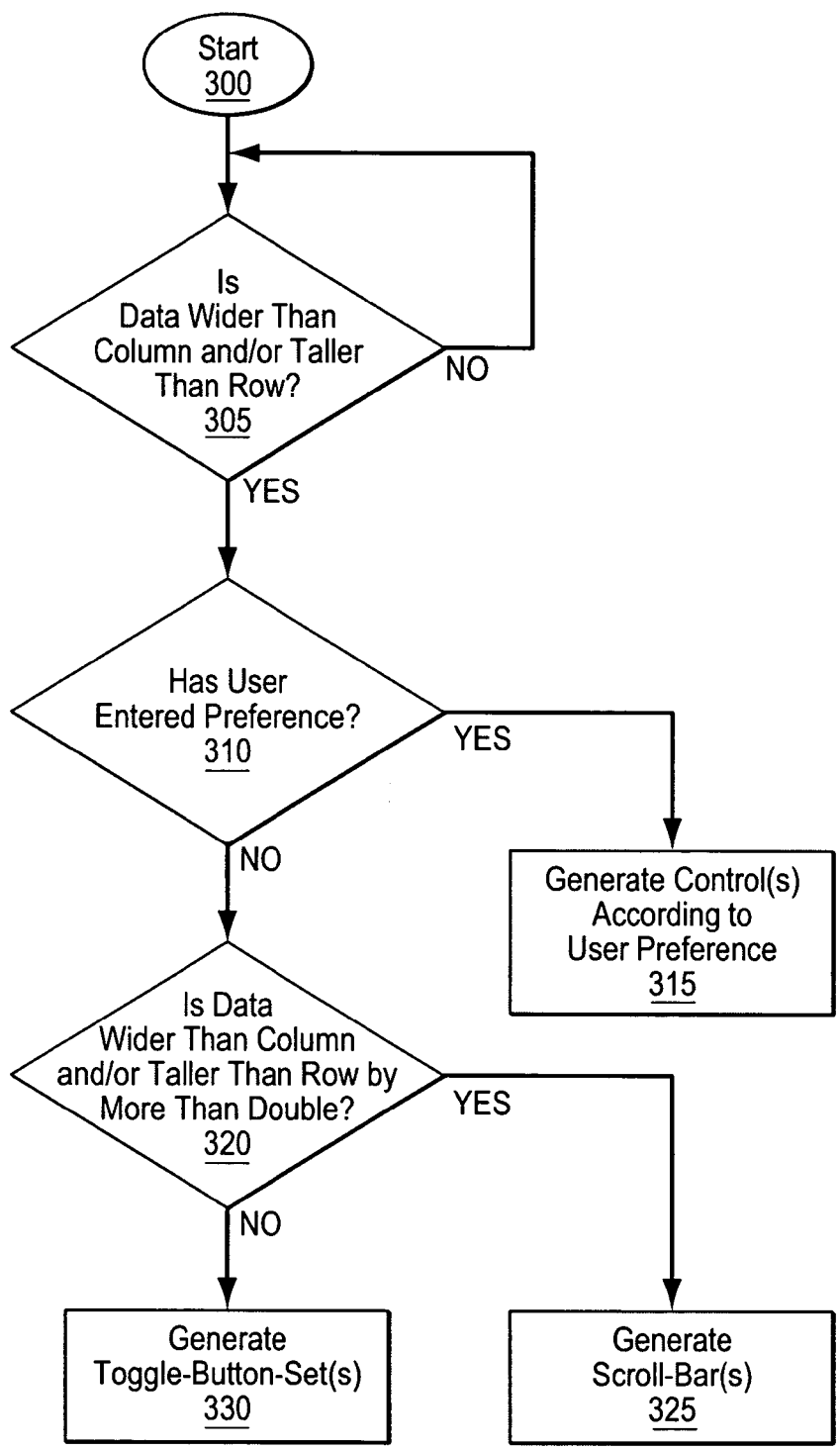
FIG. 3 is a flowchart that illustrates an example procedure in which a scroll-bar and/or a toggle-button-set is generated, according to an example embodiment of the present invention.

According to an embodiment of the present invention, a data-control generator may be provided for generating a column-data control and/or a row-data control. FIG. 3 illustrates an example procedure in which a column-data control and/or a row-data control is generated. The height and width of each cell's data may be compared to that of the cell's column and row. Whether the data is wider than the cell's column and/or taller than the cell's row may be determined in 305. If the data is not wider and/or taller, then no scroll-bar and/or toggle-button-set is generated. If the data is wider and/or taller, then a data-control may be generated.

According to an embodiment of the present invention a user interface may be provided to receive a user input. A user may input, via the interface, a preference for the type of data-control to be generated, e.g., a scroll-bar, a toggle-button-set, or a combination of the two. The user may also input, via the interface, a preference for the location of the data-controls. Whether the user has entered a preference may be determined in 310. If the user entered a preference, then, in 315, a column-data control and/or row-data control may be generated in accordance with the user preference. If a user preference has not been entered, then whether the data is wider than the column and/or taller than the row by more than double may be determined in 320. If the data is more than double as wide and/or as tall, respectively, then a scroll-bar may be generated in 325. If the data is not more than as wide and/or as tall, respectively, then a toggle-button-set may be generated in 330.

Figure 4:
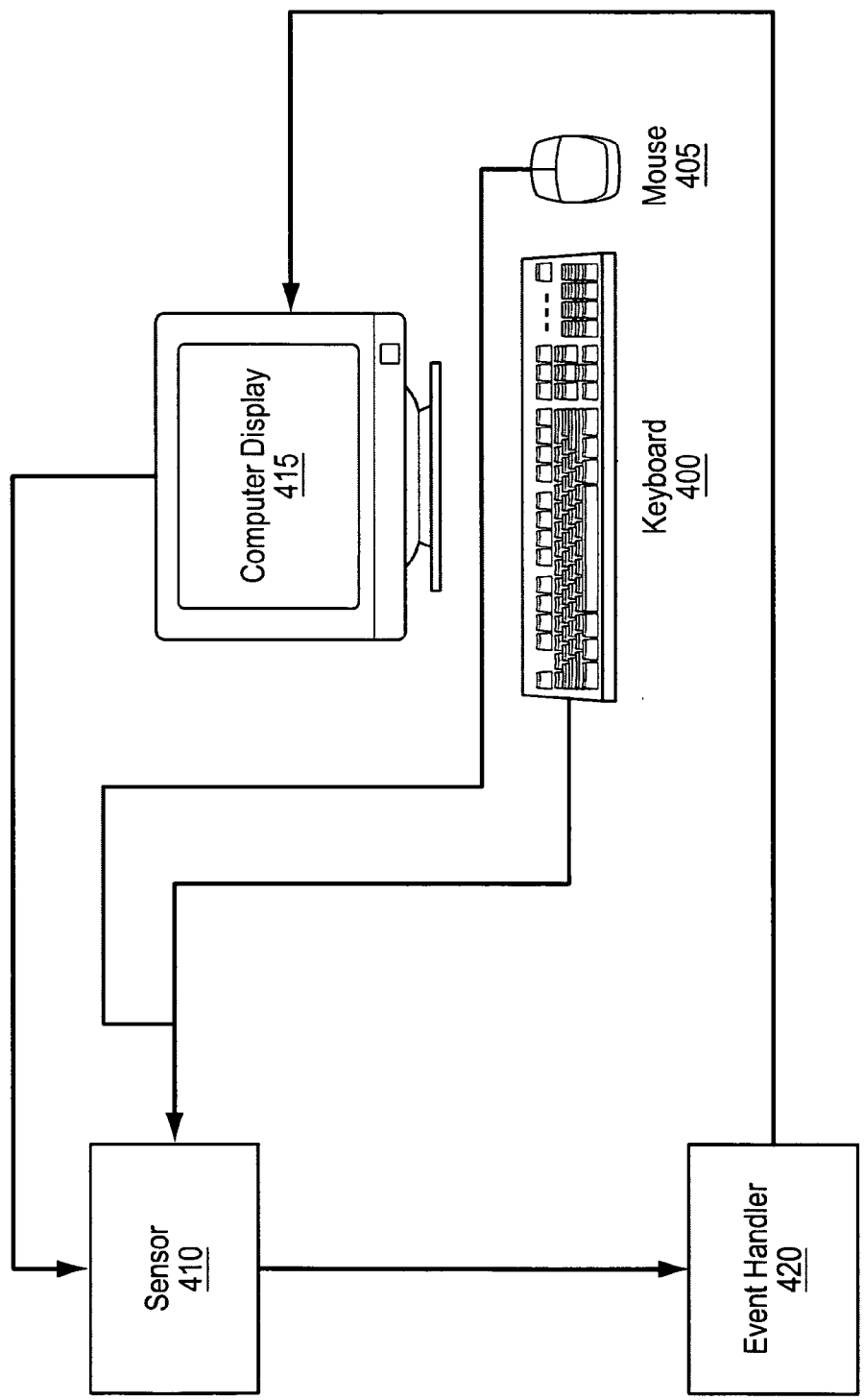
FIG. 4 is a block diagram that illustrates the components of an example computer system, according to an example embodiment of the present invention.

FIG. 4 is a block diagram that illustrates the components of an example computer system, according to an example embodiment of the present invention. Keyboard 400 and/or mouse 405 may be provided for a user input. Sensor 410 may be provided to detect the user input and to detect the position of a pointer and/or cursor displayed in computer display 415. Event handler 420 may be provided to receive the detection from the sensor. Based on the detection, the event handler may shift a scroll-bar and/or a toggle-button-set displayed in computer display 415 and may cause data displayed in computer display 415 to stream and/or toggle.

Figure 5:
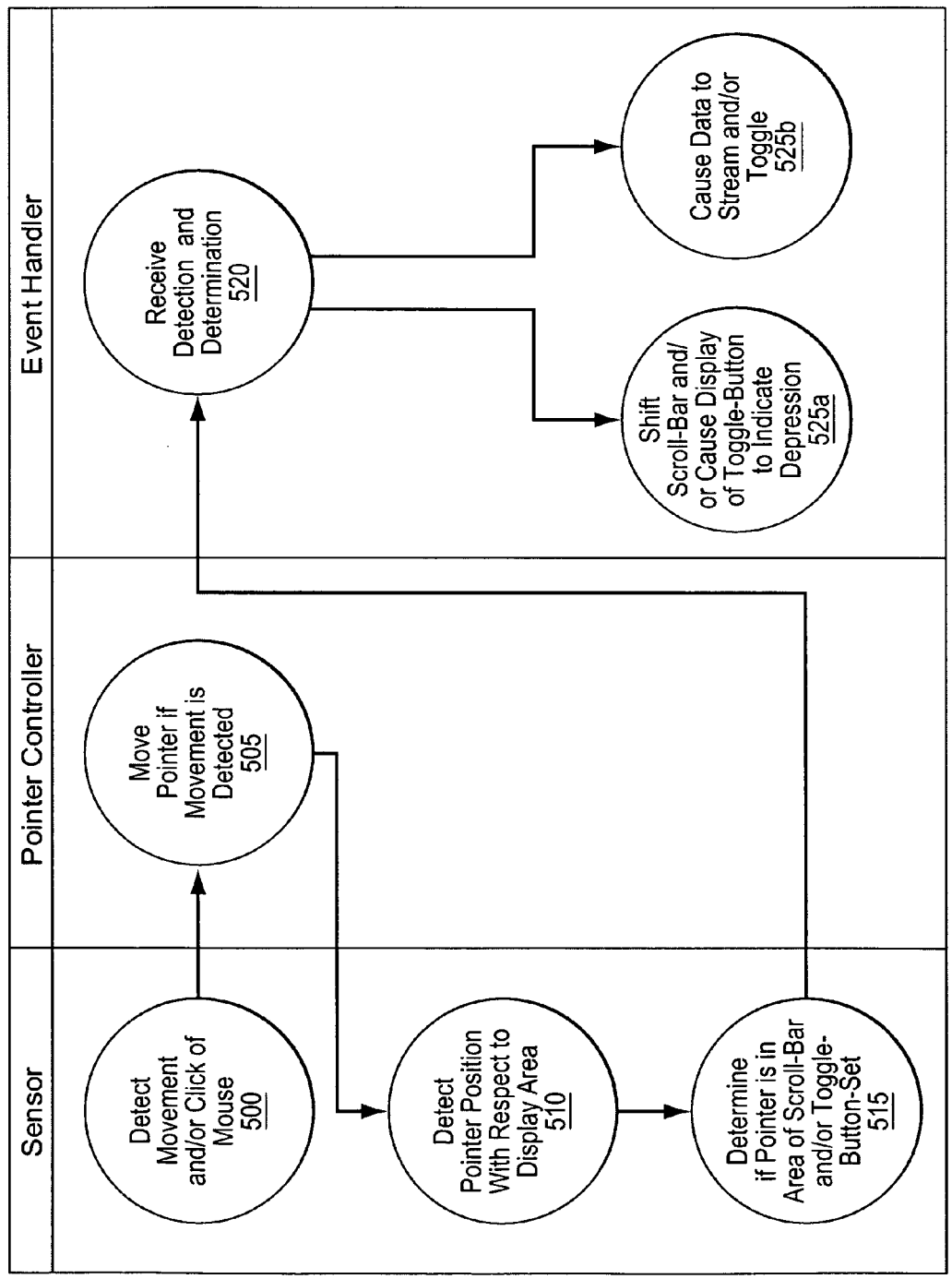
FIG. 5 is a flowchart that illustrates an example procedure in which a scroll-bar and/or toggle-button may be controlled, according to an example embodiment of the present invention.

FIG. 5 is a flowchart that illustrates an example procedure in which a scroll-bar and/or toggle-button may be controlled, according to an example embodiment of the present invention. A user may shift a scroll-bar and/or depress a toggle-button by moving a cursor, e.g., via a movement of a mouse and a click of a mouse. In 500, a sensor, for example, may detect a movement and/or a click of the mouse. In 505, based on this detection, a pointer may be moved by a pointer controller about a display area of a computer display. In 510, the sensor may also detect the position of the pointer with respect to the display area. In 515, based on the detection, the sensor may determine that the pointer is in an area of the scroll-bar and/or toggle-button.

In 520, an event handler may receive from the sensor the sensor's detections and determinations. In 525*a*, based on the received detections and determinations, the event handler may execute a routine for shifting the display of a scroll-bar and/or for displaying a toggle-button in a way to indicate its depression. Concurrently, in 525*b*, based on the received detections and determinations, the event handler may also cause data within a cell to stream or toggle in any manner previously discussed.

According to an embodiment of the present invention, the sensor may alternatively, or additionally detect a depression of an arrow key on a keyboard. The event handler may shift the scroll-bar and/or indicate a depression of a toggle-button and scroll through the data if the sensor relays an indication of a depression of a keyboard arrow key when a mouse pointer is in the area of the scroll-bar and the scroll-bar is selected.

In an embodiment of the present invention, the event handler may alternatively or additionally shift the scroll-bar and/or indicate a depression of a toggle-button when a cursor is moved within a cell from left to right or top to bottom of the data. According to this embodiment, instead of scrolling or toggling data in response to a shift of a scroll-bar and/or a depression of a toggle-button, the reverse takes place, i.e., the scroll-bar shifts and/or a toggle-button is depressed in response to a scrolling of the data.

In an example embodiment of the present invention, an article of manufacture may include a computer-readable medium having stored thereon instructions adapted to be executed by a processor. The instructions, when executed by the processor, may define a series of steps to be used for controlling a display of data. The processor may display a table arranged to show a structural relationship of data and that includes intersecting rows and columns. The processor may display a control associated with a particular one of the columns for controlling navigation of the particular one of the columns.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modification will become apparent to the skilled practitioner upon a study of the drawings, specification, and following claims.

What is claimed is:

1. A computer system comprising:
a memory and processor configured to provide a graphical user interface (GUI) that displays data in a tabular format including a plurality of rows and a plurality of displayed columns, the GUI further providing at least one horizontal scroll control;
wherein:
for each of the at least one horizontal scroll control:
the respective horizontal scroll control is selectively associated with only a single respective one of the plurality of columns;
the display of the horizontal scroll control is performed conditional upon that display settings of data associated with the respective column requires for a display of the data associated with the respective column an area that is wider than the single respective column;
the data associated with the respective column includes a text string;
the respective horizontal scroll control is manipulable for controlling navigation of the data associated with the respective column directly responsive to the manipulation of the respective horizontal scroll control;
the navigation control includes shifting a display position of at least a portion of the text string from a first displayed position of the respective column to a second displayed position of the respective column;
the respective horizontal scroll control includes a scroll bar; and
responsive to a vertical scrolling of the tabular formatted data, the processor is configured to:
remove the respective horizontal scroll control and re-display the respective horizontal scroll control; and
repeatedly modify a length of the scroll bar.

2. The computer system of claim 1, wherein the processor shifts data in each of a plurality of cells of the respective column at a same pace in response to the manipulation of the respective horizontal scroll control, data of different ones of the plurality of cells being of different lengths.

3. The computer system of claim 1, wherein:
the respective horizontal scroll control is displayed at an outer edge of the respective column; and
data of only a subset of displayed ones of the cells of the respective column is shifted in response to the manipulation of the respective horizontal scroll control based on a user-selection of the subset, data of different subsets of the displayed cells of the same respective column being controlled by the respective horizontal scroll control for different subset selections.

4. The computer system of claim 3, wherein the subset includes only one cell and the selection of the subset is performed by placement of a mouse pointer within a vicinity of the one cell, without a mouse click.

5. The computer system of claim 1, wherein:
the respective column includes a plurality of cells formed by an intersection of the respective column with the plurality of rows;
the respective row of each of the plurality of cells includes a respective plurality of cells formed by an intersection of the respective row with the plurality of displayed columns, such that all cells of the respective row share a same top and bottom position due to their belonging to the same respective row; and the respective horizontal scroll control is displayed entirely within the respective column.

6. The computer system of claim 1, wherein:

the horizontal scroll control is changed between inclusion of the scroll bar and a horizontal toggle-button-set in response to the vertical scrolling;

the horizontal toggle-button-set includes a left toggle button and a right toggle button that are alternatively selectable, a left end of the data associated with the respective column displayed whenever the left toggle button is selected and a right end of the data associated with the respective column displayed whenever the right toggle button is selected; and the horizontal toggle-button-set is displayed only upon satisfaction of a first condition that the width of the area, with respect to rows of the respective column being displayed, is not more than double the respective column's width, and the scroll bar is displayed only upon satisfaction of a second condition, in which, with respect to a relationship to the width of the area, the respective column is smaller than where the first condition is satisfied, such that the width of the area, with respect to the rows of the respective column being displayed, is more than double the respective column's width.

7. The computer system of claim 1, wherein:

the horizontal scroll control includes both the scroll bar and a horizontal toggle-button-set;

the horizontal toggle-button-set includes a right toggle button and a left toggle button;

the data within the respective column is gradually shifted by the processor in response to direct user-manipulation of the scroll bar;

in response to user-selection of the right toggle button, the data within the respective column is sharply shifted to a right end of the data and the scroll bar is automatically shifted to a right-most scroll bar position; and in response to user-selection of the left toggle button, the data within the respective column is sharply shifted to a left end of the data and the scroll bar is automatically shifted to a left-most scroll bar position.

8. A computer-implemented method comprising:

displaying, by a computer processor, a graphical user interface (GUI) in which data is displayed in a tabular format including a plurality of rows and a plurality of displayed columns, the GUI further providing at least one horizontal scroll control:

wherein:

for each of the at least one horizontal scroll control:

the respective horizontal scroll control is selectively associated with only a single respective one of the plurality of columns;

the display of the horizontal scroll control is performed conditional upon that display settings of data associated with the respective column requires for a display of the data associated with the respective column an area that is wider than the single respective column;

the data associated with the respective column includes a text string;

the respective horizontal scroll control is manipulable for controlling navigation of the data associated with the respective column directly responsive to the manipulation of the respective horizontal scroll control;

the navigation control includes shifting a display position of at least a portion of the text string from a first displayed position of the respective column to a second displayed position of the respective column;

the respective horizontal scroll control includes a scroll bar; and the method further comprises, responsive to a vertical scrolling of the tabular formatted data:

removing, by the processor, the respective horizontal scroll control and re-displaying the respective horizontal scroll control; and repeatedly modifying, by the processor, a length of the scroll bar.

9. A non-transitory computer-readable medium on which there are stored instructions executable by a computer processor, the instructions which, when executed by the processor, cause the processor to perform a method, the method comprising:

displaying a graphical user interface (GUI) in which data is displayed in a tabular format including a plurality of rows and a plurality of displayed columns, the GUI further providing at least one horizontal scroll control:

wherein:

for each of the at least one horizontal scroll control:

the respective horizontal scroll control is selectively associated with only a single respective one of the plurality of columns;

the display of the horizontal scroll control is performed conditional upon that display settings of data associated with the respective column requires for a display of the data associated with the respective column an area that is wider than the single respective column;

the data associated with the respective column includes a text string;

the respective horizontal scroll control is manipulable for controlling navigation of the data associated with the respective column directly responsive to the manipulation of the respective horizontal scroll control;

the navigation control includes shifting a display position of at least a portion of the text string from a first displayed position of the respective column to a second displayed position of the respective column;

the respective horizontal scroll control includes a scroll bar; and the method further comprises, responsive to a vertical scrolling of the tabular formatted data:

removing the respective horizontal scroll control and re-displaying the respective horizontal scroll control; and repeatedly modifying a length of the scroll bar.

* * * * *